(12) United States Patent
Onoda

(10) Patent No.: US 9,784,317 B2
(45) Date of Patent: Oct. 10, 2017

(54) VACUUM PROCESSING SYSTEM, VACUUM PROCESSING DEVICE, LUBRICATING AGENT SUPPLY DEVICE, AND LUBRICATING AGENT SUPPLYING METHOD

(71) Applicant: NISSIN ION EQUIPMENT CO., LTD, Kyoto-shi, Kyoto (JP)

(72) Inventor: Masatoshi Onoda, Kyoto (JP)

(73) Assignee: NISSIN ION EQUIPMENT CO., LTD., Kyoto-shi, Kyoto (JP)

( * ) Notice: Subject to any disclaimer, the term of this patent is extended or adjusted under 35 U.S.C. 154(b) by 217 days.

(21) Appl. No.: 14/607,661

(22) Filed: Jan. 28, 2015

(65) Prior Publication Data

US 2015/0308505 A1    Oct. 29, 2015

(30) Foreign Application Priority Data

Apr. 28, 2014 (JP) ................. 2014-092478

(51) Int. Cl.
*F16C 33/66* (2006.01)
*F16N 21/00* (2006.01)
(Continued)

(52) U.S. Cl.
CPC ........ *F16C 33/6625* (2013.01); *F16C 29/005* (2013.01); *F16N 7/385* (2013.01);
(Continued)

(58) Field of Classification Search
CPC ...... F16C 29/00; F16C 29/005; F16C 29/008;
F16C 29/04; F16C 29/041; F16C 29/043;
F16C 29/045; F16C 29/048; F16C 29/06;
F16C 29/063; F16C 29/0635; F16C 29/0638; F16C 29/064; F16C 29/0642;
F16C 29/0645; F16C 29/0647;
(Continued)

(56) References Cited

U.S. PATENT DOCUMENTS 5,170,714 A * 12/1992 Katagiri ................ B29C 51/261
104/282
2001/0014405 A1* 8/2001 Yuzawa ................... B23H 9/00
428/568

(Continued)

FOREIGN PATENT DOCUMENTS

JP 59029434 A * 2/1984 ......... H01L 21/6719
JP 4588620 B    12/2010

*Primary Examiner* — Phillip A Johnson
(74) *Attorney, Agent, or Firm* — Procopio, Cory, Hargreaves & Savitch LLP

(57) ABSTRACT

A transport system is a vacuum processing system that includes a transport device that is provided in a vacuum, and a lubricating agent supply device that supplies lubricating agent to the transport device and provided in the ambient atmosphere. The transport device has a lubricating agent flow channel that is a channel for grease injected to a site subject to lubrication. The lubricating agent supply device has a grease server that stores a lubricating agent in the ambient atmosphere, a lubricating agent supply pipe which is a channel that guides the grease stored in the grease server to the lubricating agent flow channel and that connects the grease server and the lubricating agent flow channel, and an exhaust pump that exhausts the inside of the lubricating agent supply pipe.

8 Claims, 13 Drawing Sheets

(51) Int. Cl.
*F16C 29/00* (2006.01)
*F16N 29/02* (2006.01)
*F16N 35/00* (2006.01)
*F16N 7/38* (2006.01)
*F16N 9/00* (2006.01)
*F16C 29/06* (2006.01)

(52) U.S. Cl.
CPC ............... *F16N 9/00* (2013.01); *F16N 21/00* (2013.01); *F16N 29/02* (2013.01); *F16N 35/00* (2013.01); *F16C 29/0645* (2013.01)

(58) Field of Classification Search
CPC ............... F16C 29/065; F16C 29/0652; F16C 29/0654; F16C 29/0659; F16C 29/0661; F16C 29/0664; F16C 29/0666; F16C 29/0669; F16C 29/0671; F16C 29/0673; F16C 29/0676; F16C 29/0678; F16C 29/0683; F16C 29/0685; F16C 29/0688; F16C 29/069; F16C 29/0692; F16C 29/0695; F16C 29/0697; F16C 233/6622; F16C 33/6625; F16C 33/6639; F16C 33/6685; F16N 7/38; F16N 29/00; H01L 21/677; H01L 21/67703; H01L 21/67706; H01L 2224/75102; H01L 21/6773; H01L 21/68; C23C 14/50; B05D 3/0493
USPC ........................................... 118/729, 50, 500
See application file for complete search history.

(56) References Cited

U.S. PATENT DOCUMENTS

| | | | |
|---|---|---|---|
| 2003/0138172 A1* | 7/2003 | Yabe | F16C 19/20 384/45 |
| 2005/0279285 A1* | 12/2005 | Kashiwaya | C23C 14/0694 118/726 |
| 2006/0163519 A1 | 7/2006 | Shindo | |
| 2007/0137931 A1* | 6/2007 | Chin-Pei | F16C 29/00 184/5 |
| 2008/0006779 A1* | 1/2008 | Sato | C23C 14/0694 250/483.1 |
| 2011/0103723 A1* | 5/2011 | Hsiao | F16C 29/0633 384/13 |

* cited by examiner

FIG. 2(a)
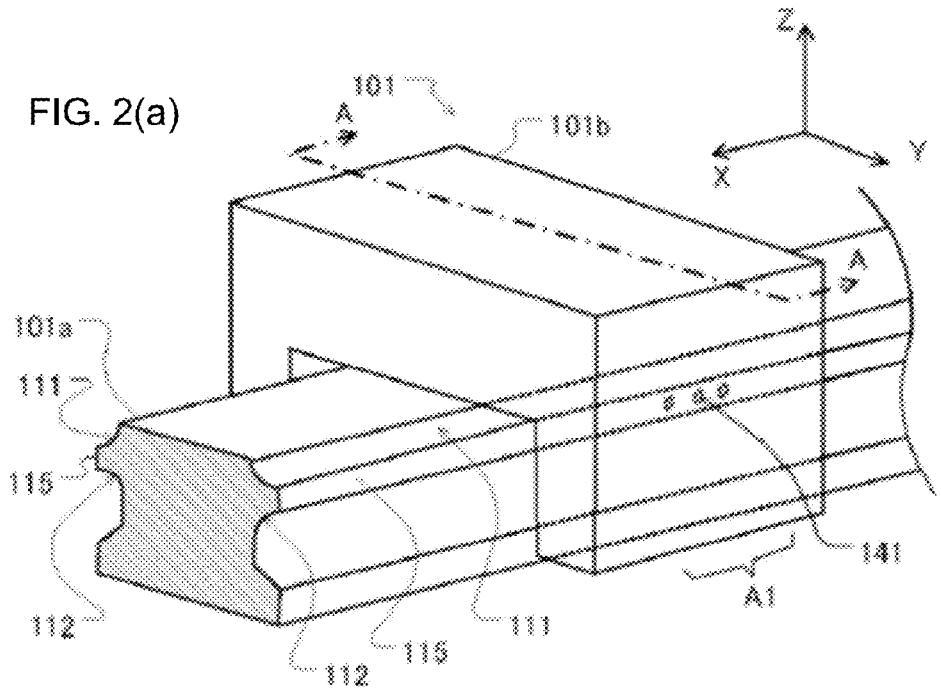
FIG. 2(b) A-A Cross Section
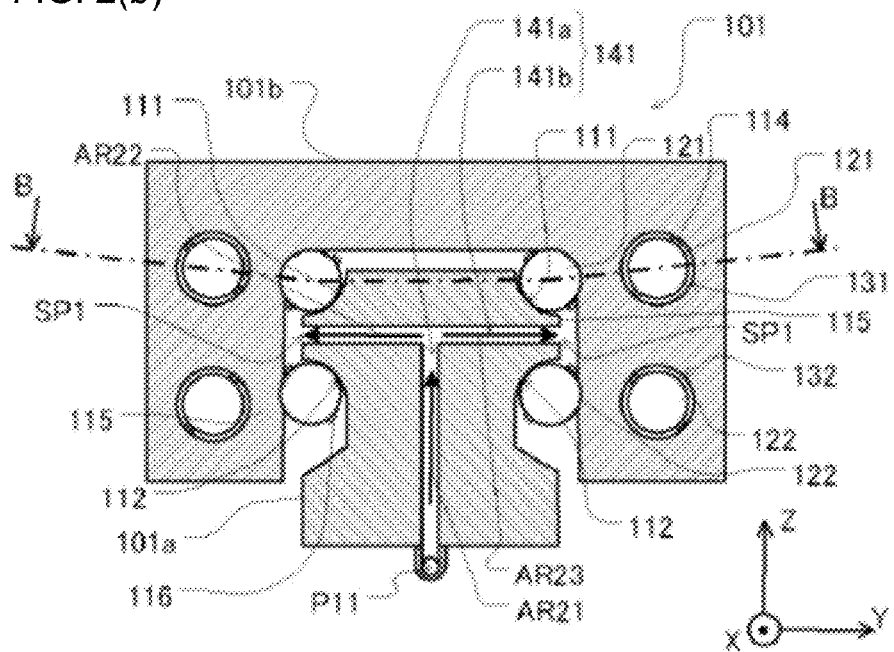

VACUUM PROCESSING SYSTEM, VACUUM PROCESSING DEVICE, LUBRICATING AGENT SUPPLY DEVICE, AND LUBRICATING AGENT SUPPLYING METHOD

The present application claims the benefit of foreign priority based on Japanese Patent Application No. 2014-092478, filed on Apr. 28, 2014, the contents of which is incorporated herein by reference in its entirety.

BACKGROUND

1. Technical Field

The present invention relates to a vacuum processing system, vacuum processing device, lubricating agent supply device, and lubricating agent supplying method.

2. Related Art

In a related art semiconductor device manufacturing process, various processes are performed while transporting a processing subject such as a wafer or the like in a vacuum environment. The transport device that is used for transporting the processing subject uses a lubricating agent such as grease or the like in order to reduce friction of the movable sites thereof.

In a vacuum environment, the lubricating agent will more readily evaporate as compared to the ambient atmosphere. Therefore, a large amount of lubricating agent is consumed. Thus, the lubricating agent must be replenished more frequently in a transport device that is provided in a vacuum environment as compared to a transport device that is provided in the ambient atmosphere.

Patent document 1 provides a transport mechanism in a vacuum chamber, a grease storage part, and a grease supply mechanism, and discloses a vacuum processing device where the grease that is stored in the grease storage part is supplied to the transport mechanism through a grease supply mechanism.

Patent Documents

[Patent document 1] Japanese Registered Patent Publication 4588620

With the vacuum processing device disclosed in patent document 1, when the grease that is stored in the grease storage part is depleted, the vacuum chamber must be opened to the atmosphere, and then grease must be supplied to the grease storage part. After the grease is replenished, the inside of the vacuum chamber that has been open to the atmosphere must be returned to a vacuum condition before restarting of the process. However, creating a vacuum requires a considerable amount of time, and the semiconductor devices cannot be manufactured during this time. In other words, the operating rate of the vacuum processing device is reduced by the process of replenishing grease.

Furthermore, with the configuration of patent document 1, the grease supply pipe is connected to a movable part that configures the transport mechanism. Therefore, the configuration of the grease supply pipe and the connecting part is complicated.

Furthermore, when the grease is released in the vacuum, a portion of the grease composition evaporates and the grease deteriorates. With the configuration of patent document 1, the grease storage part is provided in the vacuum chamber, so the grease that is stored in the grease storage part will deteriorate even when unused.

Similar problems are not limited to vacuum processing devices for semiconductor device manufacturing, and the problems are common to devices of various types that perform a process in a vacuum environment and apply a lubricating agent in a condition open to the atmosphere, as well as devices that apply lubricating agent to a movable part.

SUMMARY

In light of the foregoing, an object of the present invention is to provide a vacuum processing system and a vacuum processing device with high operating rate, as well as a lubricating agent supply device and lubricating agent supply method that can increase the operating rate of the vacuum processing device.

Furthermore, another object of the present invention is to provide a vacuum processing system and vacuum processing device that provide a lubricating agent supply mechanism with a simple configuration.

Furthermore, an object of the present invention is to provide a lubricating agent supply device that can suppress degradation of the lubricating agent that is stored in the lubricating agent storage part.

In order to achieve the aforementioned object, the vacuum processing system of the present invention includes: at least one vacuum processing device provided in a vacuum, and a lubricating agent supply device that supplies lubricating agent to the vacuum processing device and is provided in the ambient atmosphere; wherein the vacuum processing device has a lubricating agent flow channel that is a channel for lubricating agent that is injected to a site subject to lubrication;

the lubricating agent supply device comprising:

a lubricating agent storage part that stores the lubricating agent in the ambient atmosphere;

a lubricating agent supply channel that is connected to the lubricating agent storage part and the lubricating agent flow channel, and is a channel that guides the lubricating agent that is stored in the lubricating agent storage part to the lubricating agent flow channel; and an exhausting part that exhausts inside the lubricating agent supply channel.

Furthermore, the vacuum processing system of the present invention may provide that the vacuum processing device includes:

a guide rail; and a movable body that can move along the guide rail;

the site subject to lubrication is a site that is in contact with the guide rail of the movable body provided at a position that covers a predetermined region of the guide rail.

Furthermore, the vacuum processing system of the present invention, may include:

a control device wherein an opening and closing valve that is controlled by a control signal input from the control device is inserted in the lubricating agent flow channel;

the lubricating agent supply device further comprising:

an exhaust pipe that connects the lubricating agent supply channel and the exhausting part; and an exhaust valve that is inserted in the exhaust pipe and is controlled by a control signal input from the control device; and the control device causes the exhaust valve to be in an open condition, and then causes the opening and closing valve to be in an opened condition when the inside of the lubricating agent supply channel is exhausted by the exhausting part and the lubricating agent supply channel is in a vacuum condition.

Furthermore, the vacuum processing system of the present invention may provide that the vacuum processing device further includes a first connecting part that is provided in the lubricating agent flow channel; and the lubricating agent supply device further comprises a second connecting part that can detachably and hermetically connect to the first connecting part.

Furthermore, the vacuum processing device of the present invention may be a vacuum processing device provided in a vacuum and capable of receiving a supply of lubricating agent from the lubricating agent supply device provided in the ambient atmosphere; and may include:

a guide rail;

a movable body that can move along the guide rail provided on the guide rail; and a lubricating agent flow channel that is a channel for the lubricating agent to be injected at a site that connects to the guide rail of the movable body that is provided at a position that covers a predetermined region of the guide rail;

the guide rail has a tracking groove provided along the extending direction;

the site that contacts the guide rail is at least a part of a rolling body that tracks the tracking groove while in contact.

Furthermore, the vacuum processing device of the present invention may provide that a pair of tracking grooves are formed on both ends in the lateral direction of the guide rail, and the pair of tracking grooves are formed separated by a predetermined distance in a direction orthogonal to the extending direction of the guide rail and the lateral direction; and the lubricating agent flow channel is formed on the guide rail, and is configured from a lubricating agent flow through hole that is opened at a position between a pair of tracking grooves formed on both ends in the lateral direction of a predetermined region of the guide rail, and a lubricating agent relay channel that links between the lubricating agent flow through hole and the lubricating agent supply device.

Furthermore, the lubricating agent supply device of the present invention may be a lubricating agent supply device that provides lubricating agent to the lubricating agent flow channel of the vacuum processing device that has a lubricating agent flow channel which is a channel for the lubricating agent that is introduced to the site subject to lubrication, including:

a lubricating agent storage part that stores the lubricating agent in the ambient atmosphere;

a lubricating agent supply channel that is connected to the lubricating agent storage part and the lubricating agent flow channel, and is a channel that guides the lubricating agent that is stored in the lubricating agent storage part to the lubricating agent flow channel; and an exhausting part that exhausts inside the lubricating agent supply channel.

Furthermore, the lubricating agent supply device according to the present invention may provide that an opening and closing valve that is controlled by a control signal input from the control device is inserted in the lubricating agent flow channel;

the lubricating agent supply device further comprising:

an exhaust pipe that connects the lubricating agent supply channel and the exhausting part; and an exhaust valve that is inserted in the exhaust pipe and is controlled by a control signal input from the control device; and the control device causes the exhaust valve to be in an open condition, and then causes the opening and closing valve to be in an opened condition when the inside of the lubricating agent supply channel is exhausted by the exhausting part and the lubricating agent supply channel is in a vacuum condition.

Furthermore, the lubricating agent supply device of the present invention may further include:

a second connecting part provided in the lubricating agent supply channel in order to connect to the lubricating agent flow channel; and a lubricating agent sending part configuring a part of the lubricating agent supply channel, and that transmit the lubricating agent stored in the lubricating agent storage part toward the second connecting part.

Furthermore, the lubricating agent supply device of the present invention may provide a lubricating agent capturing part between the lubricating agent supply channel and the exhaust part, that captures the lubricating agent included in the gas that travels from the lubricating agent supply channel toward the exhaust part.

Furthermore, the lubricating agent supplying method of the present invention is a lubricating agent supplying method for supplying lubricating agent to a site subject to lubrication of at least one vacuum processing device provided in a vacuum, including:

exhausting a gas that remains at a site at least located in the ambient atmosphere of the lubricating agent supply channel from the lubricating agent storage part that stores lubricating agent to the site subject to lubrication, provided in the ambient atmosphere; and transmitting the lubricating agent stored in the lubricating agent storage part to the site subject to lubrication of the vacuum processing device through the lubricating agent supply channel.

BRIEF DESCRIPTION OF THE DRAWINGS

FIG. 2 (a) is a perspective view of a guide rail and a movable body at a position that covers a predetermined region of the guide rail for a transport device in a transport system according to an embodiment. FIG. 2 (b) is a cross-section view along line A-A of the transport device illustrated in (a).

DETAILED DESCRIPTION OF EXAMPLE IMPLEMENTATIONS

Figure 1:
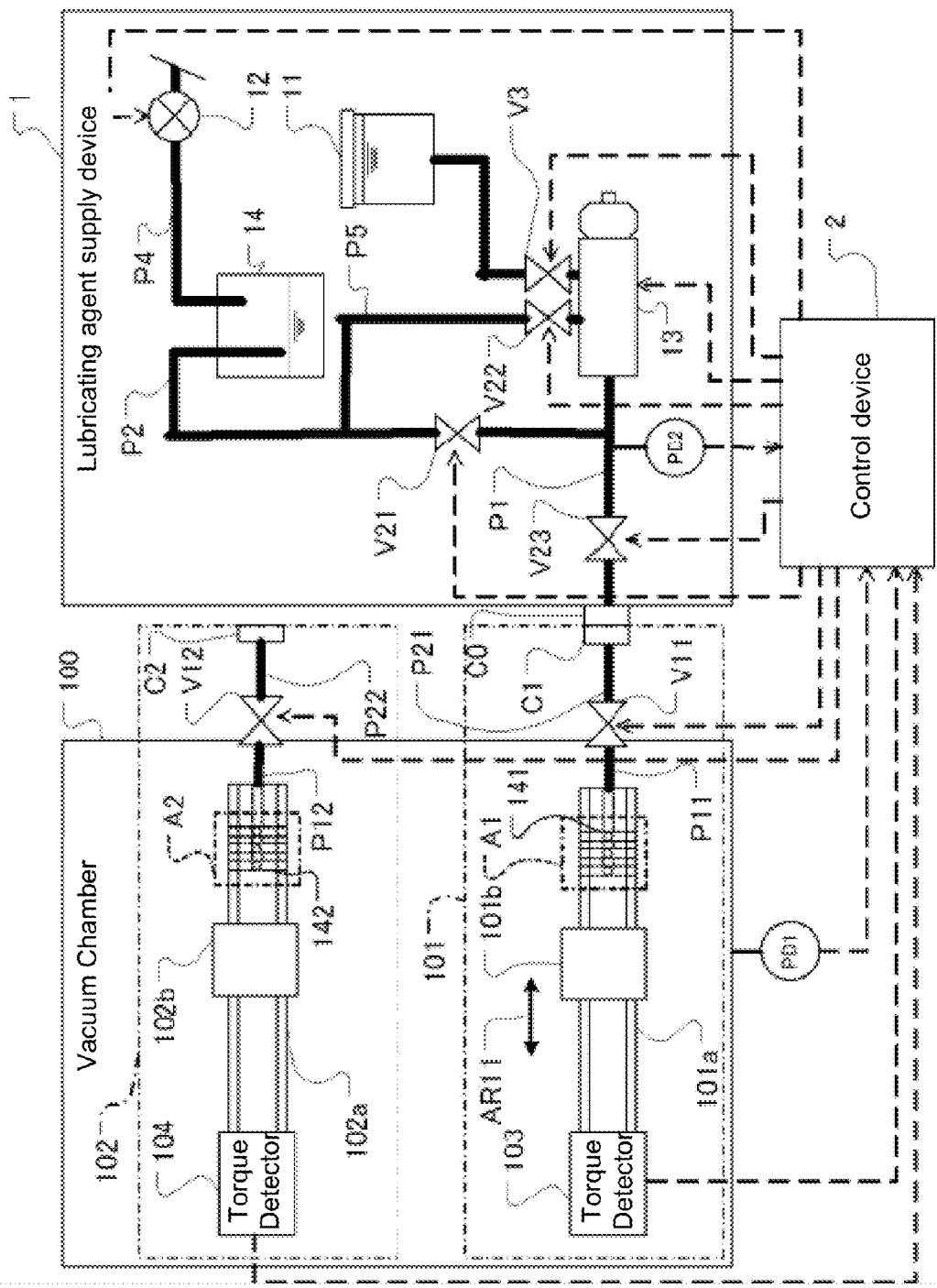
FIG. 1 is a schematic block diagram of a vacuum processing system that includes a transport according to an embodiment.

Aspects of the example embodiments may provide a vacuum processing system and a vacuum processing device with high operating rate, as well as a lubricating agent supply device and lubricating agent supply method that can increase the operating rate of the vacuum processing device.

Furthermore, aspects of the example embodiments may provide a vacuum processing system and vacuum processing device that provide a lubricating agent supply mechanism with a simple configuration.

Moreover, aspects of the example embodiments may provide a lubricating agent supply device that can suppress degradation of the lubricating agent that is stored in the lubricating agent storage part.

Accordingly, a vacuum processing system, vacuum processing device, lubricating agent replenishing device, and a transport system that includes a transport device that transports a semiconductor wafer and a lubricating agent supply device that supplies lubricating agent to the transport device are described as examples.

The transport system according to this embodiment includes a vacuum chamber 100, transport devices 101, 102 that transport semiconductor wafers, a lubricating agent supply device 1 that supplies grease which is the lubricating agent to the transport devices 101, 102, and a control device that controls the other devices. The configuration of the various components is described below.

[Vacuum Chamber]

The vacuum chamber 100 maintains the inner space in a vacuum condition. The vacuum chamber 100 has a pressure gauge PD1 that is connected to a pump for exhausting the inside of the chamber in order to exhaust the inner space, and for detecting the pressure in the vacuum chamber 100. A vacuum processing device that performs various processes on a semiconductor wafer is provided in the vacuum chamber 100.

[Transport Device]

The transport device 101 is a vacuum processing device that is provided in the vacuum chamber 100 and transports the semiconductor wafer which is the processing subject. The transport device 101 has a guide rail 101a, a movable body 101b that can move along a guide rail 101a, a transport mechanism (not illustrated) that transports the movable body 101b, and a torque detector 103 that detects the torque of a motor of the transport mechanism for driving the movable body. A specific example of the transport device 101 is an LM (e.g., linear motion) Guide. The movable body 101b is attached to the guide rail 101a in a condition that can move in the direction of arrow AR11 in FIG. 1 along the guide rail 101a.

The guide rail 101a has tracking grooves 111, 112, and a lubricating agent flow through hole 141 that is a channel for grease (lubricating agent) that is injected at a site where the movable body 101b contacts to the guide rail 101a, as illustrated in FIG. 2(a).

The tracking grooves 111, 112 are formed as a pair on both sides in the lateral direction (e.g., Y direction in the figures) of the guide rail 101a, along the extending direction (e.g., X direction in the figures) of the guide rail 101a.

the pair of tracking grooves 111, 112 are formed separated by a predetermined distance in the direction (e.g., Z direction in the figures) orthogonal to the lateral direction and the extending direction of the guide rail 101a, as illustrated in FIG. 2(b). The tracking grooves 111, 112 are formed in a shape that has mutual mirror symmetry with regards to the X-Y direction and that forms an arc in the Y-Z plane.

The lubricating agent flow through hole 141 is configured from a first hole 141a and a second hole 141b, as illustrated in FIG. 2 (b). The first hole 141a extends in the Z direction through the guide rail 101a, where one end is open to the lower surface of the guide rail 101a, and the other end is linked to the second hole 141b. The second hole 141b passes through the guide rail 101a in the lateral direction (Y direction), and is opened at a site 115 between the tracking grooves 111, 112 in a predetermined region A1 of the guide rail 101a, as illustrated in FIG. 2(a). A plurality (3 in FIG. 1 and FIG. 2(a)) of open parts of the lubricating agent flow through hole 141 is formed in both side part of the guide rail 101a, as illustrated in FIG. 1 and FIG. 2 (a). The lubricating agent is supplied from a lower end of the first hole 141a, passes through the second hole 141b, and is injected at the contact site between the movable body 101b and the guide rail 101a, as indicated by the arrows AR21, AR22, and AR23.

The open part of the lower end of the first hole 141a of the lubricating agent flow through hole 141 is connected to a chamber side connecting part (first connecting part) C1 through a supply pipe inside the chamber P11 and a supply pipe outside the chamber P21, as illustrated in FIG. 1. An opening and closing valve V11 is interposed between the supply pipe inside the chamber P11 and the supply pipe outside the chamber P21. The opening and closing valve V11 has the opening and closing controlled by a control signal supplied from a control device 2.

A lubricating agent relay channel that connects between the lubricating agent flow through hole 141 and the chamber side connecting part C1 is configured based on the supply pipe inside the chamber P11, the opening and closing valve V11, and the supply pipe outside the chamber P21. Furthermore, the lubricating agent channel that guides the lubricating agent supply from the lubricating agent supply device 1 to the contact site of the movable body 101b and the guide rail 101a is configured based on the lubricating agent relay channel and the lubricating agent flow through hole 141.

The movable body 101b can move on the guide rail 101a along the guide rail 101a as indicated by the arrow AR11, as illustrated in FIG. 1. The movable body 101b has a plurality of rolling bodies 121, 122 such as ball bearings, and holders 114, 116 that rotatably hold the plurality of rolling bodies 121, 122, as illustrated in FIG. 2 (b) and FIG. 3.

The rolling bodies 121, 122 are spheres formed from metal or the like, and roll while contacting with the tracking grooves 111, 112. The site of the rolling bodies 121, 122 that contacts with the tracking grooves 111, 112 corresponds to the site that contacts the guide rail 101a.

Figure 3:
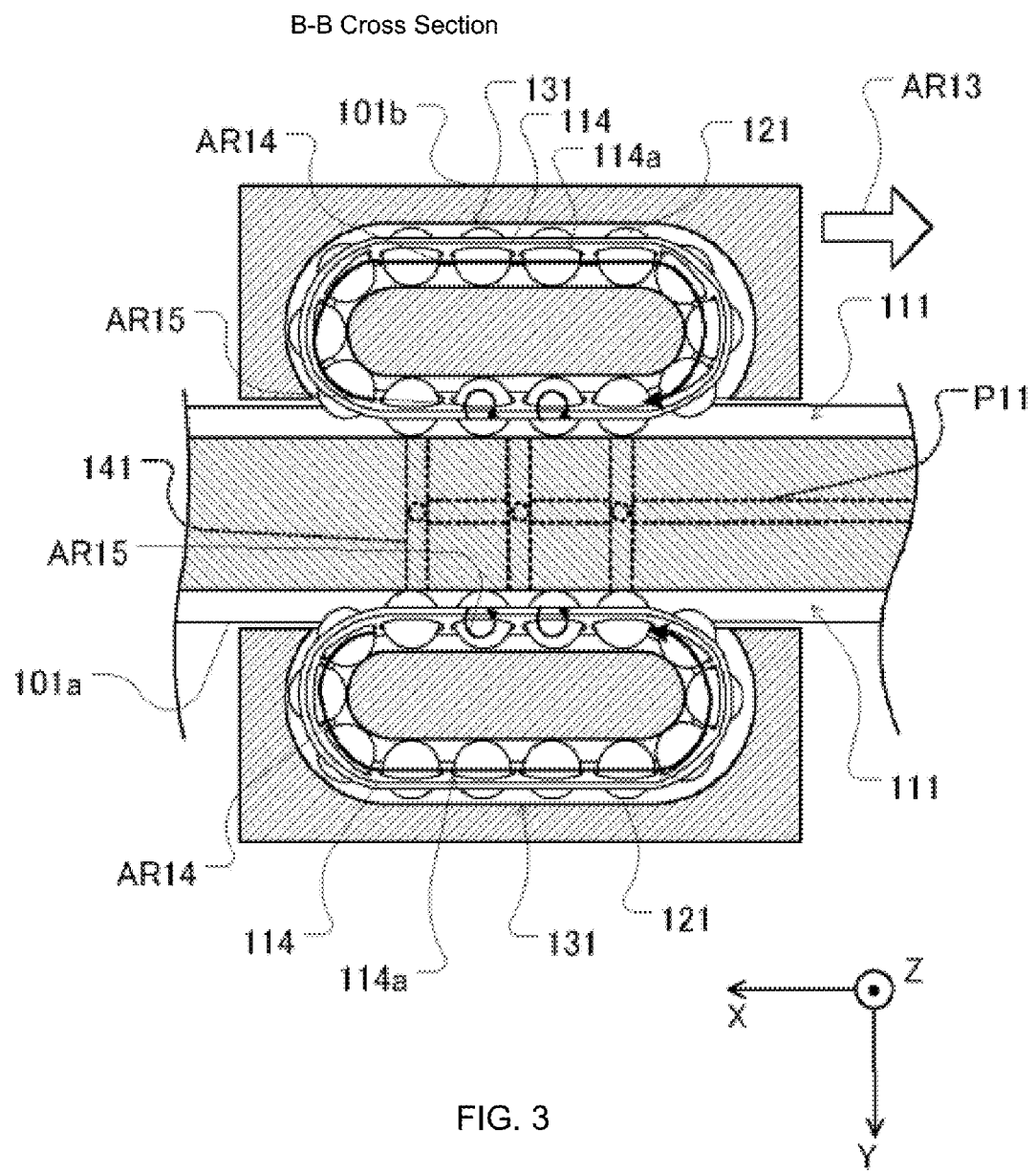
FIG. 3 is a cross-section view along line B-B of FIG. 2 (b) of the transport device according to an embodiment.

The holder 114 is formed from resin or the like for example, has essentially a ring shape, and is configured with a flexible shape that can change. The holder 114 has a thickness that is smaller than the outer diameter of the rolling body 121, and has a plurality of holes 114a that are slightly larger than the rolling body 121 in the circumferential direction. The plurality of rolling bodies 121 are held by the holder 114 in a sandwiched condition rotatable in the plurality of holes 114a provided in the holder 114, as illustrated in FIG. 3. The shape of the holder 116 and the shape of the holder 114 are substantially similar.

The plurality of rolling bodies 121 held by the holder 114 are provided in a cavity 131 formed with a loop shape in the movable body 101b, as illustrated in FIG. 3.

The plurality of rolling bodies 121 rotate as indicated by arrow AR15 while moving in the cavity 131 as indicated by arrow AR14 in FIG. 3 by the movement of the holder 114, in conjunction with the movement of the moveable body 101b.

The driving mechanism for moving the movable body 101b on the guide rail 101a is configured for example from a motor for driving the movable body (not illustrated), a rectangular ball screw (not illustrated), a ball nut (not illustrated), and two supporting members (not illustrated). The ball nut is attached to the movable body 101b. The ball screw is positioned such that the longitudinal direction thereof essentially matches the extending direction of the guide rail 101a, and one end of the ball screw in the longitudinal direction is linked to a rotating shaft of the motor for driving the movable body. Furthermore, the ball screw has a shape that can rotate around the center axis along the longitudinal direction thereof and is supported by supporting members on both end parts in the longitudinal direction. When the motor for driving the movable body rotates the ball screw, the movable body 101b moves along the guide rail 101a.

The torque detector 103 detects the amount of the rotating torque that is applied to the ball screw by the motor for driving the movable body, and outputs the torque information that indicates the detected amount of torque. When the grease that has been injected into the site of the movable body 101b that contacts with the guide rail 101a, or in other words the grease injected into the rolling bodies 121, 122 becomes depleted due to evaporation or the like, friction increases between the guide rail 101a and the movable body 101b. In this case, the rotational torque that is applied to the ball screw in order to transport the movable body 101b by the motor for driving the rotatable body will increase. The torque detector 103 is used for determining the timing that grease is supplied to the transport device 101 based on the amount of rotational torque that was detected.

As illustrated in FIG. 1, the transport device 102 has a configuration similar to the transport device 101, and has a guide rail 102a, a movable body 102b, a transport mechanism (not illustrated), a torque detector 104, and a chamber side connecting part (first connecting part) C2. Furthermore, the lubricating agent flow through hole 142 is provided in a region A2 of the guide rail 102a.

[Lubricating Agent Supply Device]

The lubricating agent supply device 1 has a grease server (lubricating agent storing part) 11, grease discharge pump (lubricating agent transmitting part) 13, grease trap tank (lubricating agent capturing part) 14, supply side contacting part (second contacting part) C0, lubricating agent supply pipe P1, and an exhausting pump 12, as illustrated in FIG. 1.

The grease server 11 stores grease in the ambient atmosphere outside of the vacuum chamber 100. The grease server 11 is connected to the grease discharge pump 13 through a grease supply valve V3 for switching the supply condition of the grease into the grease discharge pump 13 by a supply hole formed in the bottom surface.

The grease discharge pump 13 transfers the grease supplied from the grease server 11 in the direction of the supply side contacting part C0. The grease discharge pump 13 has a discharge port that is connected to the supply side contacting part (second contacting part) C0 through the lubricating agent supply pipe P1. The lubricating agent supply channel which is a channel for supplying the grease stored in the grease server 11 to the transport devices 101, 102 is configured from the grease discharge pump 13 and the lubricating agent supply pipe P1. The grease discharge pump 13 is configured from a monoaxial eccentric screw pump such as a monopump, or a centrifugal pump, or the like.

Figure 4:
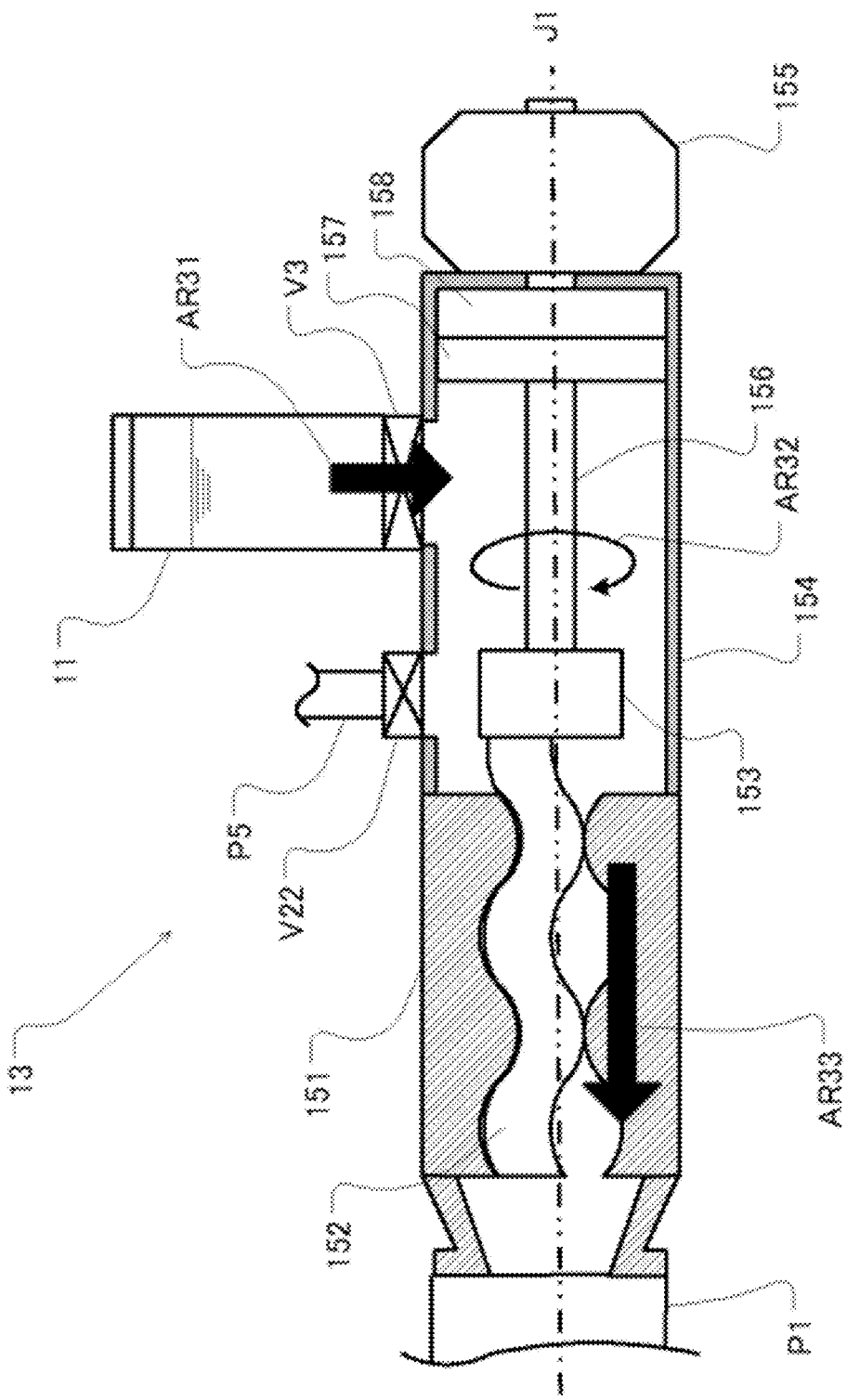
FIG. 4 is a schematic cross-section view of an example of a grease discharge pump configured from a monoaxial eccentric screw pump included in a lubricating agent supply device in a transport system according to an embodiment.

The grease discharge pump 13 has a stator 151, rotor 152, universal joint 153, housing 154, pump motor 155, drive shaft 156, shaft sealing device 157, and bearing 158, as illustrated in FIG. 4.

The inside of the housing 154 is maintained in a sealed condition by the shaft sealing device 157. Furthermore, a third exhaust pipe P5 is connected to the housing 154 through a second exhaust valve V22.

When the grease supply valve V3 is opened, grease is introduced into the housing 154 from the grease server 11 (refer to arrow AR31 in FIG. 4). Furthermore, when the second exhaust valve V22 is opened, the residual gas inside the housing 154 is discharged out of the housing 154.

The drive shaft 156 is supported by a bearing 158 that is attached to the housing 154, and one end of the drive shaft 156 in the longitudinal direction is linked to the rotating shaft of the pump motor 155, while the other end of the drive shaft 156 is connected to the rotor 152 through the universal joint 153.

The rotor 152 is formed in the shape of an external thread, and the stator 151 is formed in the shape of an internal thread. Furthermore, when the rotor 152 is inserted in the stator 151, a plurality of mutually independent regions where grease can penetrate are formed between the stator 151 and the rotor 152. When the pump motor 155 causes the drive shaft 156 to rotate around the axis J1, the plurality of regions move from the housing 154 side toward the lubricating agent supply pipe P1 side (refer to arrow AR33 in FIG. 4). At this time, the grease that has penetrated the plurality of regions will move together with the plurality of regions from the housing 154 side to the lubricating agent supply pipe P1 side. In other words, the grease that has penetrated into the plurality of regions from inside the housing 154 is pushed to the lubricating agent supply pipe P1 side in conjunction with the rotation of the rotor 152.

The amount of grease discharge from the grease discharge pump 13 is dependent on the number of rotations of the rotor 152. Therefore, the amount of grease discharge can be regulated by adjusting the number of rotations of the rotor 152.

The supply side connecting part C0 is detachably connected to the chamber side connecting parts C1, C2 provided on the transport devices 101, 102. The chamber side connecting part C1 and the supply side connecting part C0 are configured based on pipe joints that are mutually hermetically connected through a sealing material such as an O-ring or the like.

The lubricating agent supply pipe P1 provides a channel for grease from the discharge port of the grease discharge pump 13 to the supply side connecting part C0. A supply side opening and closing valve V23 for switching the supply condition of the grease from the grease discharge pump 13 to the supply side connecting part C0 is inserted in the lubricating agent supply pipe P1. Furthermore, the lubricating agent supply pipe P1 has a pressure gauge PD2 that detects the pressure inside the lubricating agent supply pipe P1.

The exhaust pump 12 illustrated in FIG. 1 pumps the exhaust the inside of the lubricating agent supply pipe P1 and the grease discharge pump 13. The exhaust pump 12 is configured from a commonly known vacuum pump such as a dry pump or the like. The residual gas in the lubricating agent supply pipe P1 is drawn into the exhaust pump 12 through a first exhaust pipe P2, grease trap tank 14, and second exhaust pipe P4. Furthermore, the residual gas in the grease discharge pump 13 is drawn into the exhaust pump 12 through a third exhaust pipe P5, grease trap tank 14, and second exhaust pipe P4. Furthermore, a first exhaust valve V21 is inserted in the first exhaust pipe P2, and the second exhaust valve V22 is inserted in the third exhaust pipe P5. The first exhaust valve V21 and the second exhaust valve V22 have the opening and closing controlled by a control signal input from the control device 2. The first exhaust valve V21 and the second exhaust valve V22 are closed when the exhaust pump 12 is stopped, and are used for maintaining the vacuum condition inside the lubricating agent supply pipe P1 and the grease discharge pump 13.

The grease trap tank 14 captures the grease that is included in the gas that is traveling from the lubricating agent supply pipe P1 and the grease discharge pump 13 toward the exhaust pump 12. The grease trap tank 14 is provided between the exhaust pump 12 and the lubricating agent supply pipe P1 or the grease discharge pump 13.

[Control Device]

The control device 2 controls the movements of the transport devices 101 and 102 placed in the vacuum chamber 100. Furthermore, the control device 2 controls grease supply to the transport devices 101 and 102. Specifically, the control device 2 acquires torque information from the torque detector 103, and determines when to begin supplying grease based on the acquired torque information. Next, the control device 2 creates a vacuum inside of the lubricating agent supply pipe P1 and the grease discharge pump 13 by controlling the operation of the exhaust pump 12 and controlling the opening and closing of the exhaust valves V21 and V22. Next, the control device 2 controls the grease supply and the supplied amount thereof by controlling the operation of the grease discharge pump 13.

Figure 5:
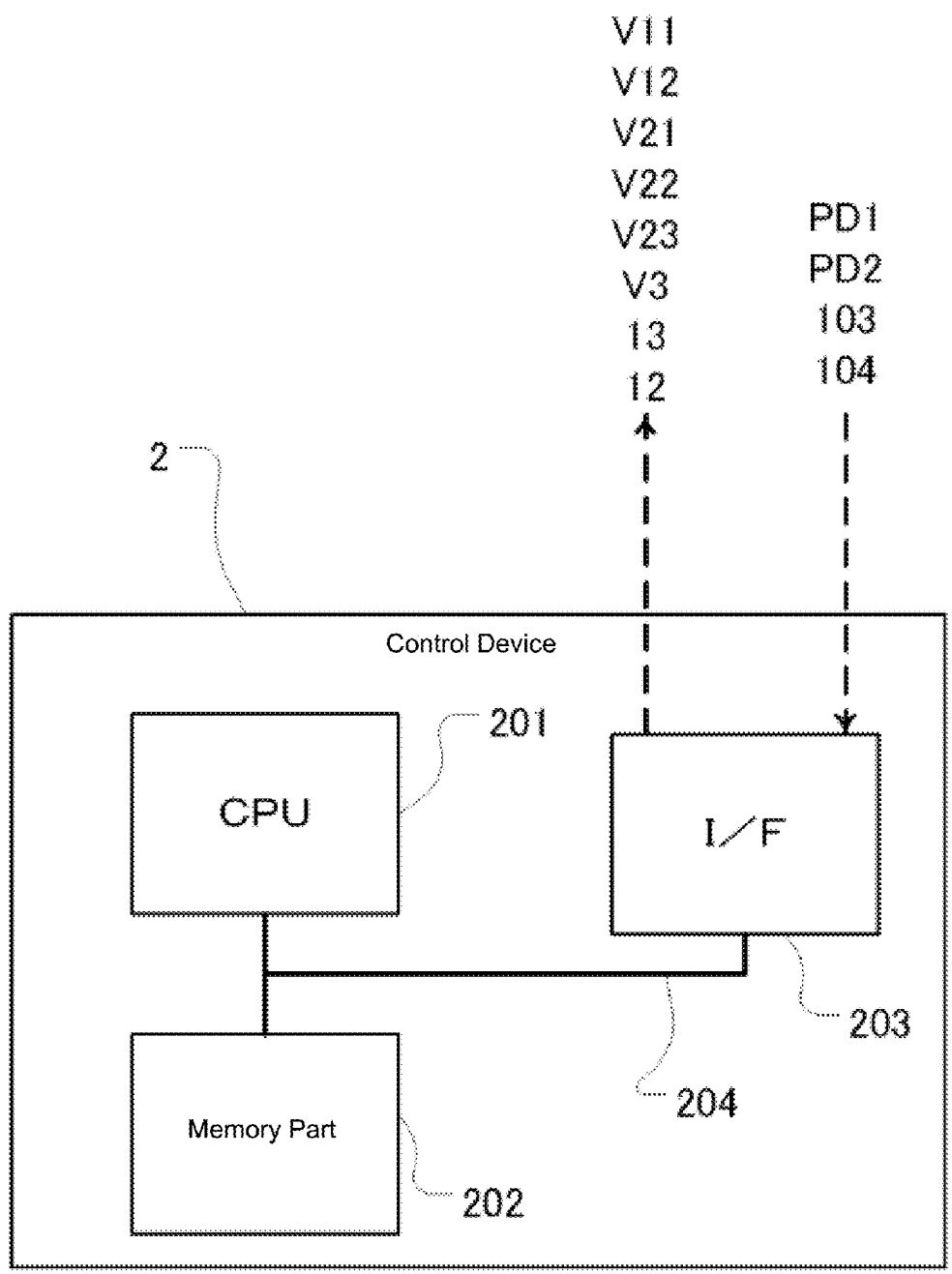
FIG. 5 is a block diagram of a control device according to an embodiment.

As illustrated in FIG. 5, the control device 2 is configured from a computer that includes a CPU 201, a memory part 202, an input-output part (I/F) 203, and a bus 204 that connects the CPU 201, the memory part 202, and the input-output part (I/F) 203. The memory part 202 stores control programs or the like that are executed by the CPU 201.

The input-output part 203 is connected to the torque detectors 103 and 104 and the pressure gauges PD1 and PD2 by the detection signal line (Refer to the dashed line arrows in FIG. 1). Furthermore, the input-output part 203 is connected to the exhaust pump 12, the grease discharge pump 13, and to each of the valves V11, V12, V21, V22, V23, and V3 by passing through the control signal line (Refer to the dashed line arrows in FIG. 1).

The CPU 201 executes the control program stored in the memory part 202, acquires torque information from the torque detectors 103 and 104 through the input-output part 203 and the detection signal line, and acquires pressure information from the pressure gauges PD1 and PD2.

The CPU 201 executes the control program, and based on the acquired torque information and the pressure information, transmits the control signal to the exhaust pump 12 and the grease discharge pump 13, and starts and stops the exhaust pump 12 and the grease discharge pump 13, and controls the opening and closing of valves V11, V12, V21, V22, V23, and V3 by transmitting the control signal to valves V11, V12, V21, V22, V23, and V3.

Next, the operation of the vacuum processing system according to the embodiment is described.

The control device 2 controls the transport devices 101 and 102, and transports the semiconductor wafer which is the processing subject, while controlling another vacuum processing device not illustrated in the figures, and performs various processes on the semiconductor wafer.

Figure 6:
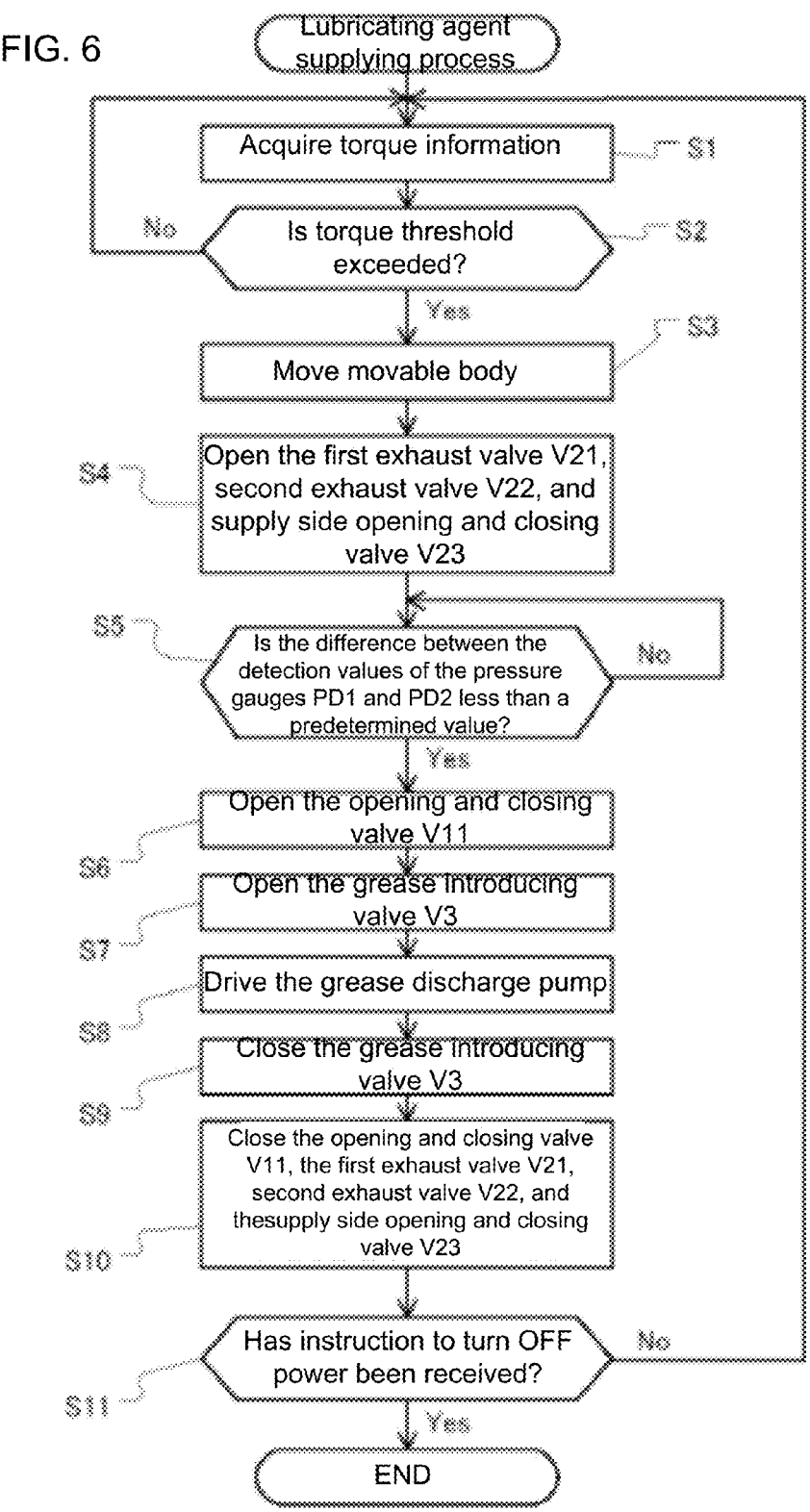
FIG. 6 is a flowchart showing the control action executed by the control device according to an embodiment.

The control device 2 performs general control movements in parallel with performing lubricating agent supply processing as illustrated in FIG. 6 and supplying lubricating agent to the transport devices 101 and 102.

The lubricating agent supply process is described below in detail.

As illustrated in FIG. 1, the chamber side connecting part C1 is connected to the supply side connecting part C0. Furthermore, the exhaust pump 12 continues to operate.

The control device 2 starts the transport device 101 and begins the lubricating agent supply process illustrated in FIG. 6, and acquires torque information from the torque detector 103 (Operation S1).

Next, the control device 2 determines whether or not the torque value indicated by torque information exceeds a torque threshold value (Operation S2). If the torque value exceeds the predetermined torque threshold (Operation S2: Yes), there is a lack of grease in the tracking grooves 111 and 112; because grease needs to be injected, the control device 2 switches over to the grease injecting operation (Operations S3 to S10). The torque threshold is set to a value, for example, that is approximately 10% larger than the standard value of torque that is applied to the ball screw from the movable body driving motor.

If the control device 2 determines that the torque value does not exceed the torque threshold (Operation S2: No), the process of Operation S1 is performed again. In other words, as long as the torque value is not over the threshold value, the control device 2 repeats the process of Operation S1.

On the other hand, if the control device 2 determines that the torque value exceeds the torque threshold (Operation S2: Yes), the moveable body 101b is moved to a location that covers the region A1 where injecting grease can be performed.

Next, the control device 2 opens the first exhaust valve V21, the supply side opening and closing value V23, and the second exhaust valve V22 (Operation S4). Thereby, the exhaust pump 12 exhausts the inside of the lubricating agent supply pipe P1, the supply pipe outside the chamber P21 and the grease discharge pump 13 through the first exhaust pipe P2, the second exhaust pipe P4, and the third exhaust pipe P5. When this occurs, the grease included in the exhausting gas is captured in the grease trap tank 14.

Next, the control device 2 acquires the detected value of the pressure gauges PD1 and PD2, and determines whether or not the difference between the acquired detected values of the pressure gauges PD1 and PD2 is less than a predetermined value (Operation S5). In this determination process, the control device 2 determines whether or not the difference between the inner pressures of the lubricating agent flow through hole 141 and the lubricating agent supply pipe P1 is sufficiently small to allow connecting.

If the control device 2 determines that the difference between the detecting values of the pressure gauges PD1 and PD2 exceeds the predetermined value (Operation S5: No), exhausting by the exhaust pump 12 is continued.

On the other hand, if the control device 2 determines that the difference between the detected values of the pressure gauges PD1 and PD2 is below the predetermined value (Operation S5: Yes), the control device 2 opens the opening and closing valve V11 (Operation S6).

Next, the control device 2 opens the grease supply valve V3 (Operation S7). Thereby, grease retained in the grease server 11 is supplied into the grease discharge pump 13 through the supply hole formed on the bottom surface of the grease server 11.

Furthermore, the control device 2 operates the grease discharge pump 13 (Operation S8) at approximately the same time as performing Operation S7. Thereby, grease in the grease discharge pump 13 is transferred towards the supply side connecting part C0. The amount of grease transferred from the grease discharge pump 13 is dependent on the number of rotations of the rotor 152 in the grease discharge pump 13.

The lubricating agent supply pipe P1, the supply pipe outside the chamber P21, the supply pipe inside the chamber P11, and the lubricating agent flow through hole 141 are filled with grease supplied from the previous lubricating agent supply process. Thereby, the grease that was filled is pressurized by the grease transferred from the grease discharge pump 13, and grease is injected from the lubricating agent flow through hole 141 to the area SP1 surrounded by the moveable body 101b and the rolling bodies 121 and 122 illustrated in FIG. 2 (b).

In other words, grease in the supply pipe inside the chamber P11 is pushed out in the direction of arrow AR21 by passing through the first hole 141a. Next, as illustrated by arrows AR22 and AR23, grease is divided between the second hole 141b and the third hole 141c, is pushed out, and injected into area SP1.

Grease injected to the area SP1 is injected to the site where the rolling bodies 121 and 122 nearby the area SP1 contact to the tracking grooves 111 and 112.

The control device 2 rotates the rotor 152 for only a predetermined number of rotations, and stops the grease discharge pump 13 when the standard amount of grease is supplied.

Next, in a normal semiconductor wafer transporting process, if the moveable body 101b moves along the guide rail 101a, the rolling bodies 121 and 122 roll in the tracking grooves 111 and 112, and grease injected in the area SP1 extends to approximately the entire body of the tracking grooves 111 and 112 by passing through the site where the rolling bodies 121 and 122 contact to the tracking grooves 111 and 112. As a result, friction when the moveable body 101b moves on the guide rail 101a, or in other words, the friction between the rolling bodies 121 and 122, and the tracking grooves 111 and 112 is reduced.

Note, in Operation S8, the control device 2 can cause the grease discharge pump 13 to operate again, depending on the amount of rotational torque that the moveable body driving motor applies to the ball screw. Specifically, after the control device 2 discharges grease from the grease discharge pump 13, the control device 2 moves the moveable body 101b along the guide rail 101a. Furthermore, the control device 2 acquires the torque value detected by the torque detector 103, when grease has supplied to the guide rail 101a. Furthermore, if the acquired detecting value is higher than the torque threshold, the control device 2 should move the grease discharge pump 13 again.

After Operation S8 is performed, the control device 2 closes the grease supply valve V3 (Operation S9). Thereby, the supply of grease from the grease server 11 to the inside of the grease discharge pump 13 is stopped.

Next, the control device 2 opens the opening and closing valve V11, the first exhaust valve V21, the supply side opening and closing valve V23, and the second exhaust valve V22 (Operation S10). Thereby, the inside of the supply pipe in the chamber P11 and the lubricating agent flow through hole 141 can be maintained in a vacuum.

Next, the control device 2 determines whether or not power source off instructions have been received (Operation S11). For example, if the user performs the designated operation with the input device connected to the control device 2 in order to turn OFF the power source of the lubricating agent supply device 1 or the transport device 101 and 102, the control device 2 receives the power source OFF instructions.

If the control device 2 determines that the power source OFF instructions have not been received (Operations S11: No), the control device 2 performs the Operation S1 process again.

On the other hand, if the control device 2 determines that the power source OFF instructions have been received (Operation S11: Yes), the process is ended.

With the transport system according to the embodiment, the grease server 11 is placed in the ambient atmosphere, and by just adding grease to the grease server 11, grease can be essentially continuously supplied to the transport devices 101 and 102. Thereby, similar to the conventional configuration (for example, the configuration described in Japanese registered patent publication number 4588620), the vacuum chamber does not need to be exposed to the ambient atmosphere every time the grease received in the grease receiving part provided in the vacuum chamber evaporates. Therefore, the reduction in the operating rate of the vacuum processing device when the vacuum chamber 100 is exposed to the ambient atmosphere can be eliminated.

Furthermore, the lubricating agent flow through hole 141 is fixed to the guide rail 101a in the transport device 101 according to the embodiment. Therefore, there is no need to provide a configuration that detachably connects to the moveable body 101b and the grease receiving part in the vacuum, similar to the aforementioned conventional configuration. Furthermore, the configuration can be simplified as compared to the conventional configuration.

Furthermore, the grease server 11 is provided in the atmosphere outside of the vacuum chamber 100 in the transport system according to the embodiment. Therefore, degradation of the grease stored in the grease server 11 by vaporizing one component of the grease can be prevented.

First Alternate Example

An example configured by including the lubricating agent flow through hole 141 in the lubricating agent flow channel guide rail 101a was described in the embodiment, but the configuration of the lubricating agent flow through hole is not limited to having one part provided in the guide rail 101a. For example, one part of the lubricating agent flow channel can be provided to the moveable body.

Figure 7A:
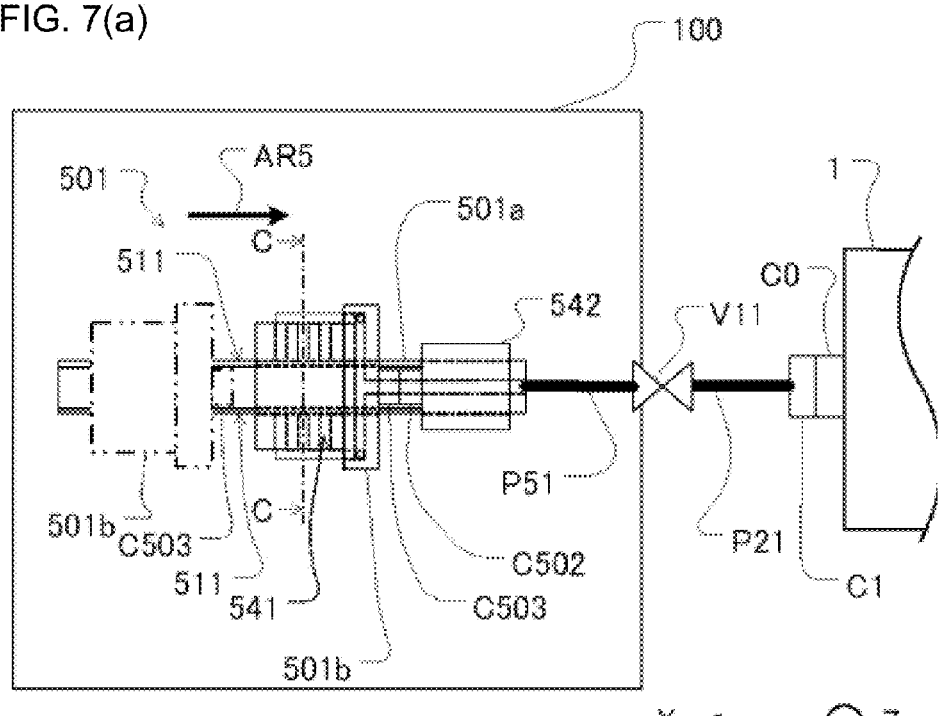
FIG. 7(a) is a schematic plan view diagram of a transport device according to a first alternate example of an embodiment.
Figure 7B:
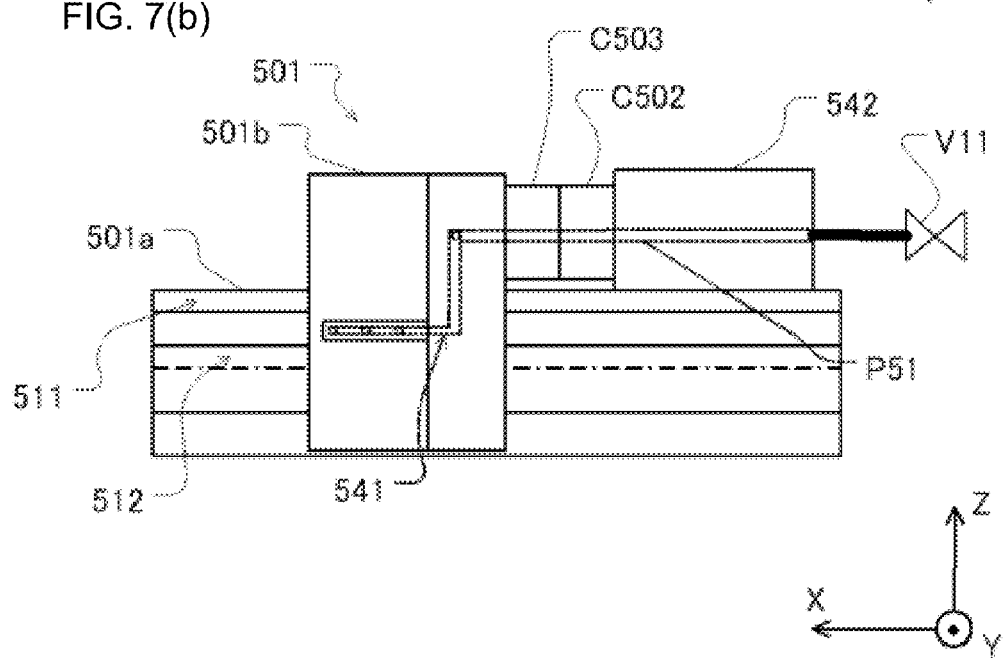
FIG. 7 (b) is a schematic side surface view of the transport device of the first alternate example.

As illustrated in FIG. 7 (a), the transport device 501 that relates to the first alternate example includes a guide rail 501a, a moveable body 501b, and a lubricating agent relaying part 542. Note, the same symbols are maintained with respect to the above-disclosed embodiment where the elements are the same, for the sake of consistency.

The lubricating agent relaying part 542 is positioned in the extending direction of the guide rail 501a on the guide rail 501a. The lubricating agent relaying part 542 has a relaying part side connecting part C502. The lubricating agent relaying part 542 is connected to the chamber side connecting part C1 by passing through the supply pipe in the chamber P51, the opening and closing valve V11, and the supply pipe outside the chamber P21. The lubricating agent relaying channel that is the grease channel is configured from the supply pipe in the chamber P51, the opening and closing valve V11, and the supply pipe outside the chamber P21.

The moveable body 501b has a moveable body side flow channel 541 and a moveable body side connecting part C503. The moveable body side connecting part C503 can be attached and detached in relation to the relaying part side connecting part C502 by having the moveable body 501b move on the guide rail 501a. The moveable body side flow channel 541 is the grease channel that connects between the region in contact with the moveable body side connecting part C503 and the guide rail 501a of the moveable body 501b. Here, the lubricating agent flow channel is configured from the lubricating agent relaying channel, the lubricating agent relaying part 542, the moveable body side connecting part C503, and the moveable body side flow channel 541.

Figure 8:
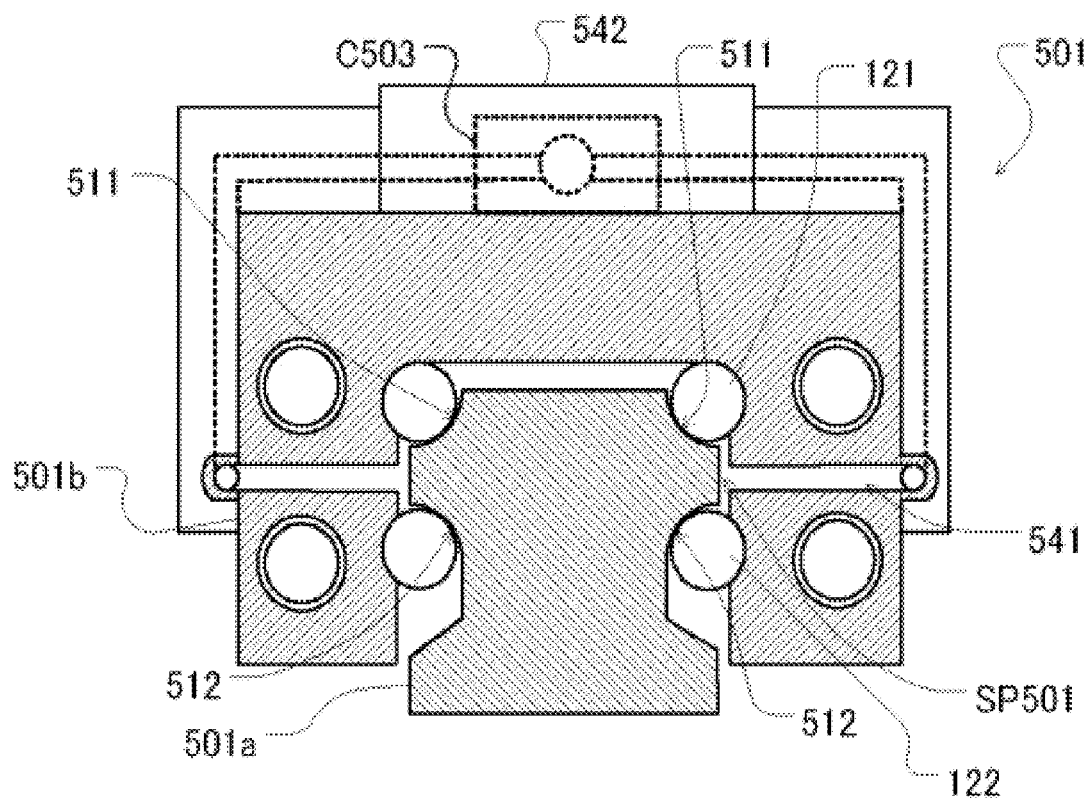
FIG. 8 is a cross-section view along line C-C of the transport device illustrated in FIG. 7 (a).

As illustrated in FIG. 7 (b) and FIG. 8, the moveable body side flow channel 541 extends from the moveable body side connecting part C503 to the region opposing the region between the tracking grooves 511 and 512 of the guide rail 501a of the inner side of the moveable body 501b.

Here, as illustrated by the arrow AR5, when the moveable body 501b moves in a direction that is closer to the lubricating agent relaying part 542 and arrives at a predetermined area, the relaying part side connecting part C502 and the moveable body side connecting part C503 become connected. When this occurs, the moveable body side flow channel 541, the supply pipe outside the chamber P21, and the lubricating agent supply pipe P1 connect by passing through the lubricating agent relaying part 542 and the supply pipe in the chamber P51.

According to the present configuration, the grease supply location that is able to supply grease to the moveable body side flow channel 541 can be changed by only changing the position of the lubricating agent relaying part 542. Therefore, there may be an advantage in which the grease supply location may be easily changed compared to providing the lubricating agent flow through hole on the guide rail side.

Second Alternate Example

In the embodiment, a configuration was described where one of the chamber side connecting parts C1 and C2 was provided for each of the transport devices 101 and 102, and grease was individually supplied to the transport devices 101 and 102. However, the configuration is not limited to providing one of the chamber side connecting parts to each of the plurality of transport devices 101 and 102. For example, the chamber side connecting part (first connecting part) can be one of the common connecting parts for the plurality of transport devices (for example, transport devices 101 and 102). Furthermore, a lubricating agent injecting pipe for each of the plurality of transport devices can be connected to one of the connecting parts.

Figure 9:
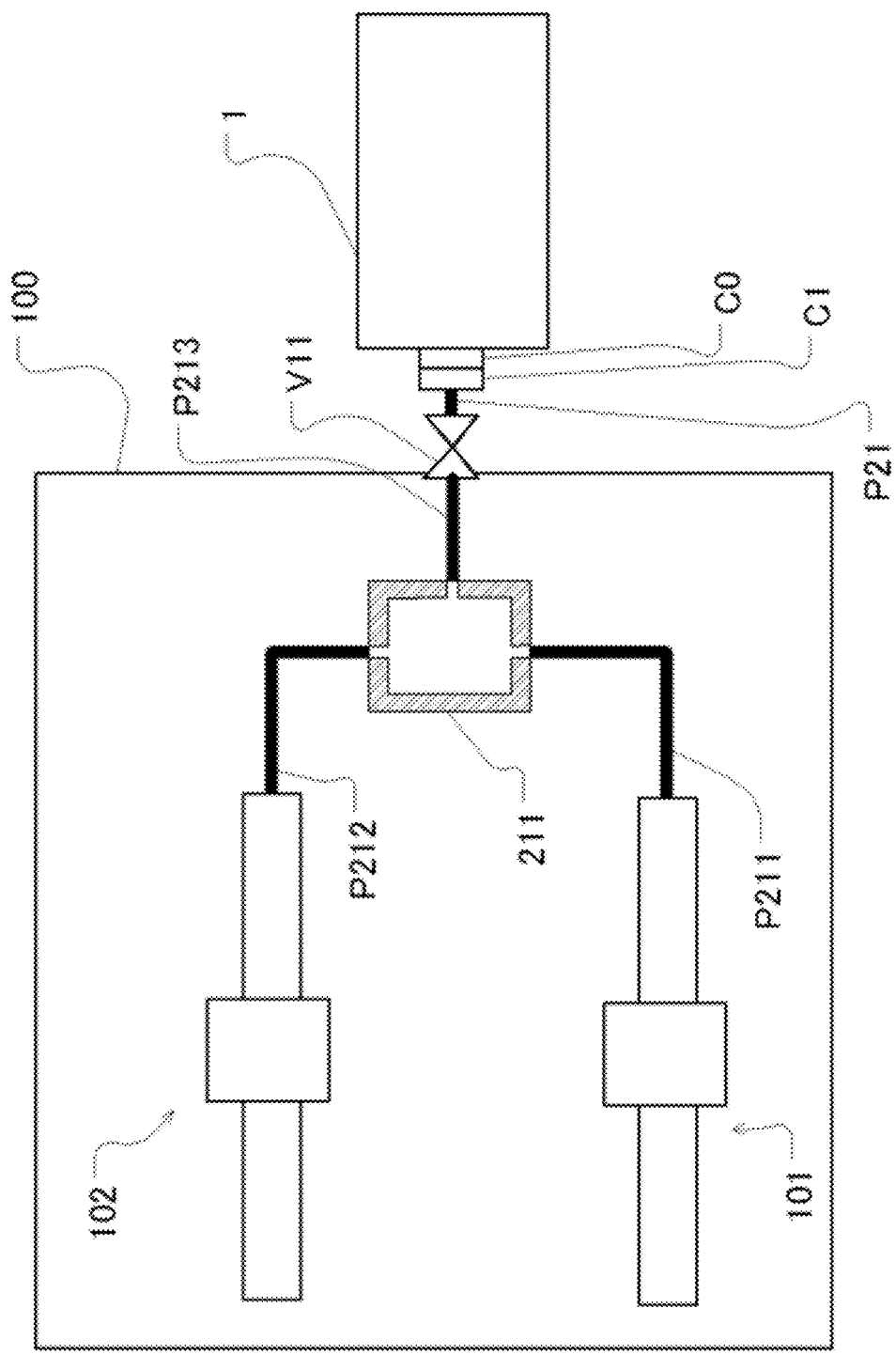
FIG. 9 is a schematic block diagram of the transport system according to the second alternate example of an embodiment.

As illustrated in FIG. 9, the transport system according to the second alternate example includes a manifold 211. Note, the same symbols are maintained with respect to the above-disclosed embodiment where the elements are the same, for the sake of consistency.

The first supply pipe in the chamber P211, the second supply pipe in the chamber P212, and the third supply pipe in the chamber P213 are connected to the manifold 211. The first supply pipe in the chamber P211 configures one part of the lubricating agent supply channel to the transport device 101, and the second supply pipe to the chamber P212 configures one part of the lubricating agent supply channel to the transport device 102. The third supply pipe in the chamber P213 is connected to the supply pipe outside the chamber P21 by passing through the opening and closing valve V11.

Since grease can be simultaneously supplied to the plurality of transport devices 101 and 102, the grease supply operation efficiency may be optimized with the present configuration.

Note, valves (not illustrates in the figure) are inserted into each of the first supply pipe in the chamber P211 and the second supply pipe in the chamber P212, and the control device 2 is configured so as to control the opening and closing of each of the individual valves. For example, if there are differences in use frequency of the transport devices 101 and 102, a difference occurs in the grease supply frequency required for the transport devices 101 and 102. For example, the grease supply frequency to the transport device 101 becomes smaller compared to the grease supply frequency to the transport device 102. Therefore, for example, grease can be supplied to only the transport device 101 by opening the valve that is inserted into the first supply pipe in the chamber P211 and closing the valve that is inserted into the second supply pipe in the chamber P212 in the present configuration.

Figure 10:
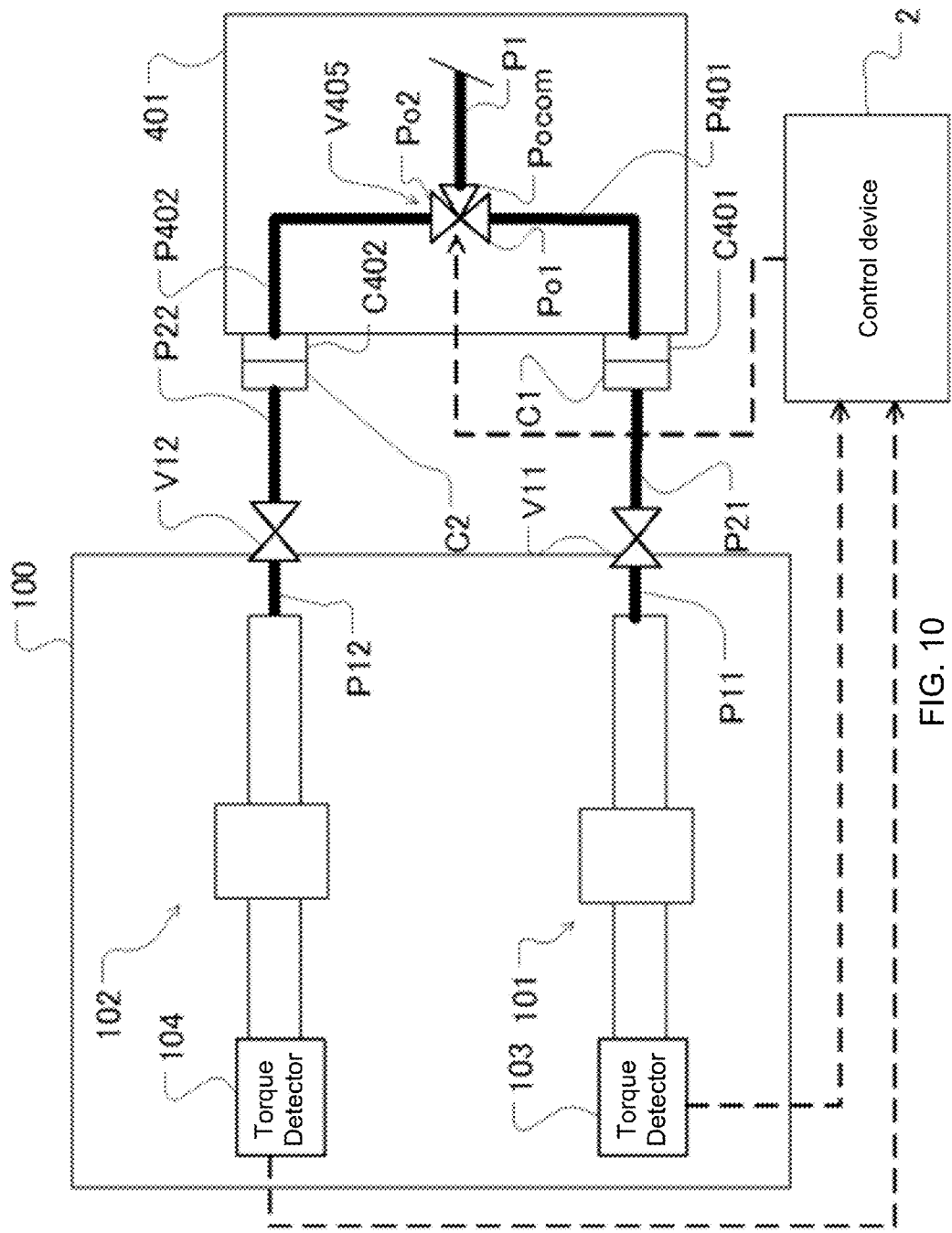
FIG. 10 is a schematic block diagram of the transport system according to the third alternate example of an embodiment.

Furthermore, a three way valve (supply channel switching part) can be provided instead of the manifold 211 in the configuration illustrated in FIG. 10. The configuration is such that the grease supply destination is selected from a plurality of transport devices, and only one chamber side connecting part needs to be provided, and therefore, the structure can be simplified accordingly.

Third Alternate Example

An example in which only one supply side connecting part C0 was provided was described in the embodiment, but the number of supply side connecting parts C0 is not limited to one. For example, the lubricating agent supply device can include a plurality of supply side connecting parts (second connecting parts) in the configuration including a plurality of transport devices. Furthermore, the lubricating agent supply pipe (lubricating agent supply channel) can be provided with a three way valve (supply channel switching part) that switches the supply destination to any of the plurality of supply side connecting parts.

As illustrated in FIG. 10, the lubricating agent supply device 401 according to the third alternate example includes two supply side connecting parts C401 and C402, supplementary lubricating agent supply pipes P401 and P402 connected to two supply side connecting parts C401 and C402, and a three way valve V405 (supply channel switching part) connected to the supplementary lubricating agent supply pipes P401 and P402 and the lubricating agent supply pipe P1. Note, the same symbols are maintained with respect to the above-disclosed embodiment where the elements are the same, for the sake of consistency.

The three way valve V405 has a common port Pocom that connects to the lubricating agent supply pipe P1, a first port Po1 that connects to the supplementary lubricating agent supply pipe P401, and a second port Po2 that connects to the supplementary lubricating agent supply pipe P402.

Each of the supply side connecting parts C401 and C402 can be connected to the chamber side connecting parts C1 and C2. The three way valve V405 switches the port that links the common port Pocom to either the first port Po1 or the second port Po2 based on the control signal transmitted from the control device 2. In this way, the grease supply destination can be switched to the transport device 101 or the transport device 102 by switching the three way valve V405.

The switching operation for the grease supply destination can be simplified by the present configuration.

Note, a manifold (not illustrated in the figure) that connects to the lubricating agent supply pipe P1 and to each of the supply side connecting parts C401 and C402 can be provided instead of the three way valve V405 in the configuration illustrated in FIG. 10. In this case, grease supplied from the lubricating agent supply pipe P1 can be simultaneously supplied to the supply side connecting parts C401 and C402.

Fourth Alternate Example

An example in which the guide rails 101a and 102a are in a straight line is described in the embodiment, but the shape of the guide rail is not limited to being in a straight line. For example, the guide rail can have a region that is a curved line. In this case, the moveable body can be moved along the guide rail so that a curved line trajectory is drawn.

Figure 11:
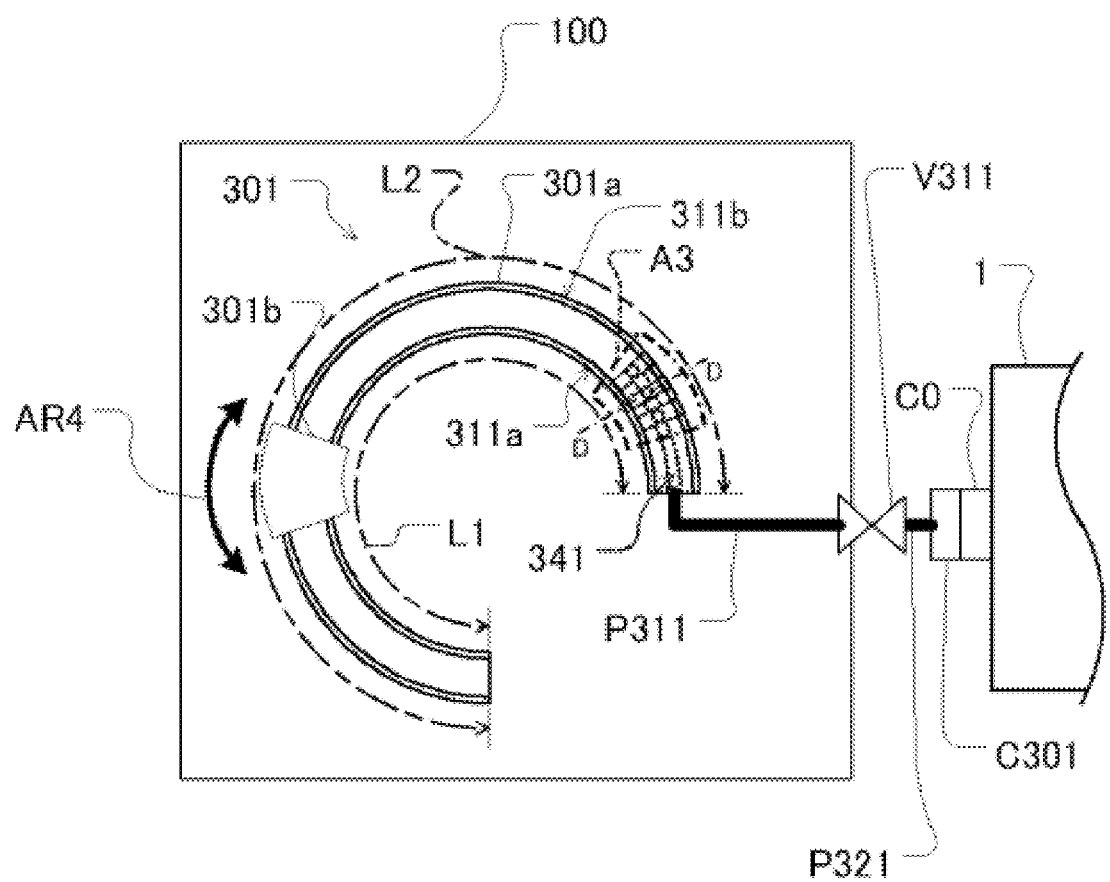
FIG. 11 is a schematic plan view diagram of the transport system according to the fourth alternate example of an embodiment.
Figure 12:
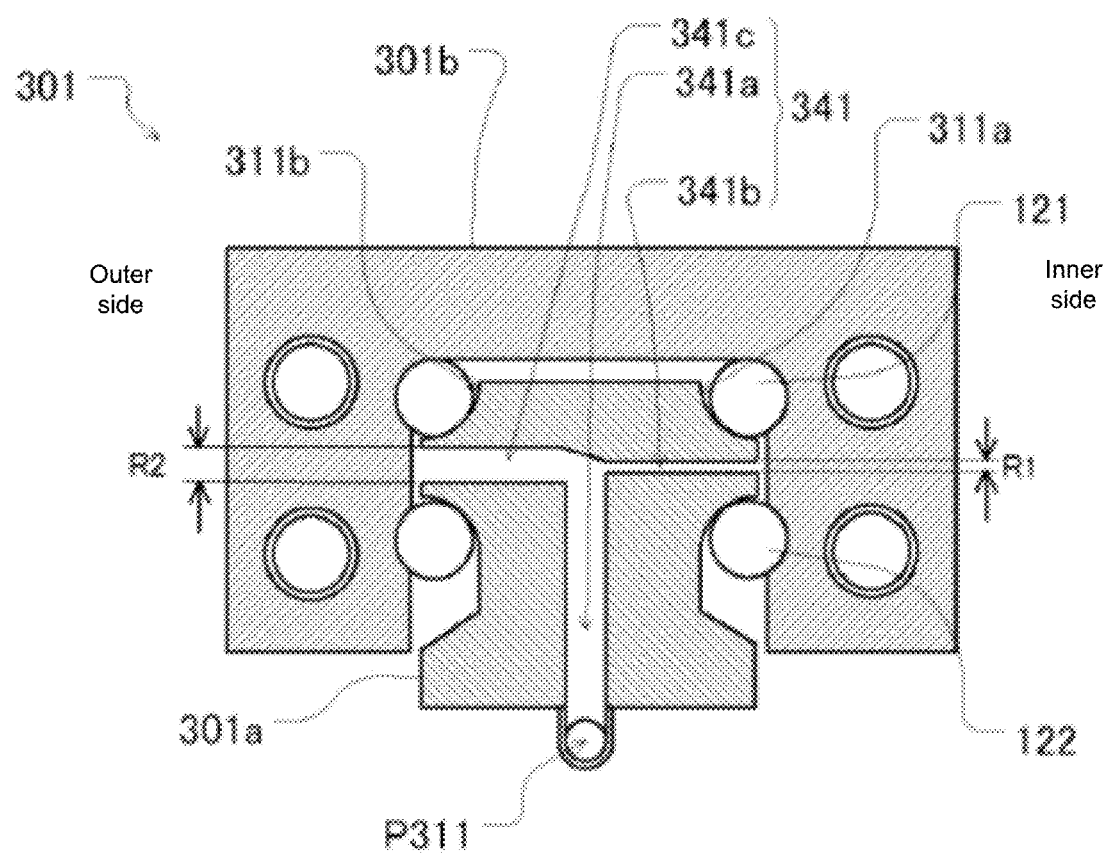
FIG. 12 is a cross-section view along line D-D of FIG. 11 showing the condition where the movable body is located at a position that covers a predetermined region of the guide rail, for a transport device according to the fourth alternate example of an embodiment.

As illustrated in FIG. 11 and FIG. 12, the transport device 301 according to the fourth alternate example includes a guide rail 301a and a moveable body 301b. Note, the same symbols are maintained with respect to the above-disclosed embodiment where the elements are the same, for the sake of consistency.

The guide rail 301a extends in approximately a planar projected arc shape. As illustrated by the arrow AR4 in FIG. 11, the moveable body 301b can move along the guide rail 301a so that an approximately arc shaped trajectory is drawn. The lubricating agent flow through hole 341 is provided on the guide rail 301a. The lubricating agent flow through hole 341 is configured from the first hole 341a, the second hole 342b, and the third hole 342c. Furthermore, the first hole 341a is connected to the chamber side connecting part C301 by passing through the supply pipe in the chamber P311 and the supply pipe outside the chamber P321. The opening and closing valve V311 is interposed between the supply pipe in the chamber P311 and the supply pipe outside the chamber P321. Furthermore, grease injection can be performed from the lubricating agent flow through hole 341 to the tracking grooves 311a and 311b, when the moveable body 301b is positioned in the predetermined region (Refer to area A3 in FIG. 11) that covers the region where the lubricating agent flow through hole 341 in the guide rail 301a opens.

The length L1 of the tracking groove 311a is shorter compared to the length L2 of the tracking groove 311b. In this case, the volume of the inward side area of the tracking groove 311a is smaller compared to the volume of the inward side area of the tracking groove 311b. If the same amount of grease is supplied to both of the two tracking grooves 311a and 311b, based on either one of the volumes of the two tracking grooves 311a and 311b, the amount of grease provided to one may be too much or too little. In this case, the amount of grease supplied to the rolling element contacting region in the tracking groove 311a must be reduced compared to the amount of grease supplied to the rolling body contacting region of the tracking groove 311b.

As illustrated in FIG. 12, the amount of grease supplied to the two tracking grooves 311a and 311b are varied with the transport device 301 by changing the inner diameter of the second hole 341b of the lubricating agent flow through hole 341 and the inner diameter of the third hole 341c. Specifically, the inner diameter of the second hole 341b and the inner diameter of the third hole 341c are set so that the following relational Equation (1) is established between the lengths L1 and L2 of each of the tracking grooves 311a and 311b.

$$R1^2/R2^2 = L1/L2 \qquad \text{Equation (1)}$$

In the transport device 301 including the planar projection arc shaped guide rail 301a of the present configuration, an appropriate amount of grease according to the length of each of the tracking grooves 311a and 311b can be supplied to each of the two tracking grooves 311a and 311b provided on both sides in the width direction of the guide rail 301a Note, the amount of grease supplied to each of the tracking grooves 311a and 311b can be varied by changing the number of opening parts of the lubricating agent flow through hole 341 on the inner side and the outer side of the guide rail 301a.

Furthermore, an example in which the guide rail 301a is in an approximately planar projection arc shape is described in the present alternate example, but the embodiments are not limited thereto. For example, but not by way of limitation, the guide rail can have a shape that is combined with both a curved line portion and a straight line portion. In this case, a moveable body that can be transformed and matched to the curved line portions and the straight line portion should be used. For example, a plurality of small sized moveable bodies that can move along the curved line portion can be used and connected by passing through a universal joint or the like.

Other Alternate Examples

With the transport system according to the embodiment, the control device 2 may generate an alarm that notifies the user that grease must be supplied to the transport devices 101 and 102.

Herein, the control device 2 reports an alarm when the torque value is over the designated threshold based on the torque information input from the torque detectors 103 and 104.

Figure 13:
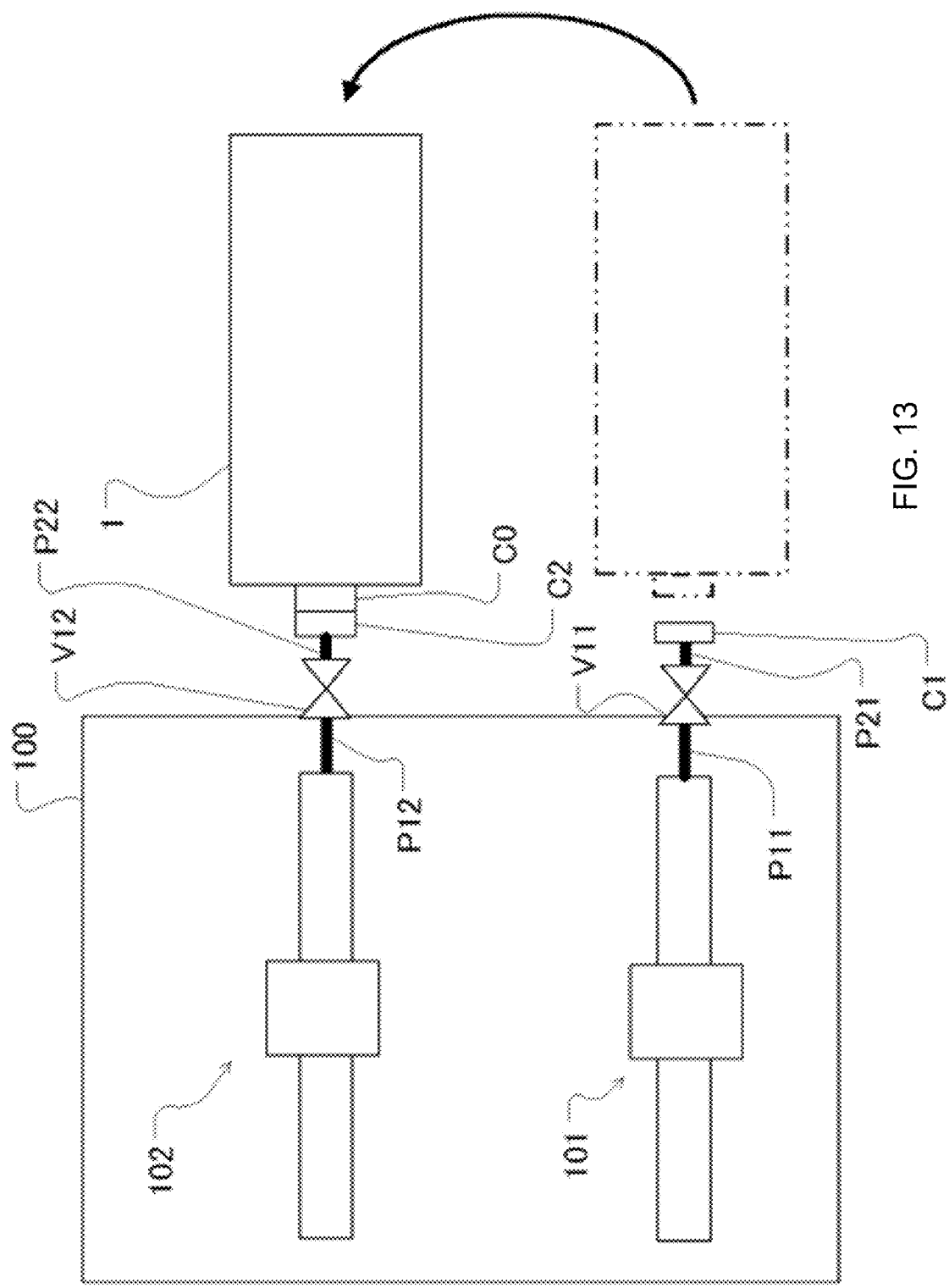
FIG. 13 is a diagram illustrating an example of using the lubricating agent supply device that is included in the lubricating agent supply device in a transport system of another alternate example of an embodiment.

For example, when the supply side connecting part C0 is connected to the chamber side connecting part C1, the control device 2 generates an alarm that notifies that grease must be supplied to the transport device 102. As illustrated in FIG. 13, in this case, if the user reconnects the supply side connecting part C0 to the chamber side connecting part C2 from the chamber side connecting part C1, grease can be supplied to the transport device 102.

An example in which the second hole 141b formed in the guide rail 101a penetrates the guide rail 101a in an approximately straight line in the Y direction was described in the embodiment. However, the shape of the second hole 141b is not limited to this shape. For example, the second hole can be slanted so that the second hole approaches the tracking groove 111 side as the second hole approaches from the portion connecting the first hole to both end surfaces orthogonal to the Y direction of the guide rail 101*a*. In other words, the first hole and second hole can be formed so that an approximately Y shaped lubricating agent flow channel is formed.

Furthermore, an example in which one side and opposite side of the second hole 141*b* in the Y direction appear when viewed from the designated cross section orthogonal in the X direction is described in the embodiment. However, the cross section where one side of the second hole 141*b* in the Y direction appears and the cross section where opposite side of the second hole 141*b* in the Y direction appears can be different along the X direction. In other words, the location in which the second hole 141*b* opens in the cross section in one direction and in the cross section in opposite direction in the Y direction of the guide rail 101*a* can differ.

An example in which a grease discharge pump 13 is used was described in the embodiment, but methods for providing grease from the grease server 11 to the lubricating agent flow through hole 141 and the supply pipe in the chamber P11 are not limited to this example. For example, a configuration in which grease is provided from the grease server 11 to the lubricating agent flow through hole 141 and the supply pipe in the chamber P11 using the pressure difference between the inner pressure and the atmospheric pressure of the lubricating agent flow through hole 141 and the lubricating agent supply pipe P1 can be used.

Specifically, the grease server 11 can be directly connected to the lubricating agent supply pipe P1 by passing through the grease supply valve. In this case, if the grease supply valve opens, the grease within the grease server 11 is pushed out into the lubricating agent supply pipe P1 by the atmospheric pressure applied to the side opposite to the grease supply valve side.

Alternatively, a configuration in which gas is inducted to the side opposite the grease inducting valve side, and grease within the gas server 11 is pushed out into the lubricating agent supply pipe P1 by using the pressure from the inducted gas can be used.

The simplification of the structure of the lubricating agent supply device can be accomplished since the grease discharge pump 13 can be omitted in the present configuration.

A configuration including the grease server 11 was described in the embodiment, but if the grease discharge pump 13 can, for example, store the grease in the inside part like the monopump or the like, a configuration in which the grease server 11 is omitted can be used. The monopump functions as the lubricating agent storing part in this configuration.

In this case, the user opens the grease supply valve V3, and supplies grease in the grease discharge pump 13 using tubes, grease guns, or the like filled with grease. Note, the tubes, grease guns, or the like can be connected to the grease supply valve V3 at all times.

The miniaturization of the lubricating agent supply device can be accomplished since the grease server 11 can be omitted in the present configuration.

An example in which the transport system including the transport devices 101 and 102 was described in the embodiment, but another type of vacuum processing system including the vacuum processing device that needs to inject grease at fixed intervals can be used. For example, a configuration in which grease is injected to the region where the rolling element of the bearing is in contact with the tracking groove can be used as the transport device that uses a bearing.

Furthermore, an example in which a transport mechanism that transports moveable bodies and uses ball screws and ball nuts was described in the embodiment, but the type of transporting mechanism is not limited to the embodiment. For example, the transporting mechanism can use a linear motor.

An example in which grease is injected to the region in contact with the guide rail 101*a* of the moveable body 101*b* positioned in a location that covers the region A1 of the guide rail 101*a* was described in the embodiment, but the lubrication target region is not limited to the embodiment. For example, the lubrication target region can be the region in contact with the ball nut of the ball screw.

An example that uses semi-solid grease as the lubricating agent was described in the embodiment, but the type of lubricating agent is not limited to the embodiment. For example, liquid lubricating oil can be used as the lubricating agent.

The rolling body 121 is not limited to a sphere, and the rolling body can be configured from another type of rolling body such as a roller, or the like. In this case, the shape of the tracking groove 111 should be made into a shape compatible with the shape of the rolling element (for example, if the rolling element is a cylindrical roller, the surface of the tracking groove 111 is approximately plane shaped).

An example in which a transport system including the opening and closing valves V11, V12, V311 and the supply side opening and closing valve V23 was described in the present embodiment, but the type of valve is not limited to the opening and closing valve, and other types of valves can be used instead.

DESCRIPTION OF THE SYMBOLS

1: Lubricating agent supply device
2: Control device
11: Grease server (lubricating agent storing part)
12: Exhausting pump (exhausting part)
13: Grease discharge pump (lubricating agent sending part)
14: Grease trap tank (lubricating agent capturing part)
100: Vacuum chamber
101, 102, 301, 501: Transport device (transport device)
101*a*, 102*a*, 301*a*, 501*a*: Guide rail
101*b*, 102*b*, 301*b*, 501*b*: Moveable body
103, 104: Torque detector
111, 112, 311*a*, 311*b*: Tracking groove
141, 142, 341: Lubricating agent flow through hole (lubricating agent flow channel)
211: Manifold
541: Moveable body side flow channel
542: Lubricating agent relaying part
C0, C401, C402: Supply side connecting part (second connecting part)
C1, C2, C301: Chamber side connecting part (first connecting part)
P1: Lubricating agent supply pipe
P2: First exhaust pipe
P4: Second exhaust pipe
P5: Third exhaust pipe
P11, P51, P311: Supply pipe inside the chamber
P21, P321: Supply pipe outside the chamber
P211: First supply pipe in the chamber
P212: Second supply pipe in the chamber
P213: Third supply pipe in the chamber V3: Grease supply valve
V11, V12, V311: Opening and closing valve
V21: First exhaust valve
V22: Second exhaust valve
V23: Supply side opening and closing valve
V405: Three way valve (Supply channel switching part)

What is claimed is:

1. A vacuum processing system comprising:
   at least one vacuum processing device provided in a vacuum, and a lubricating agent supply device that supplies lubricating agent to the vacuum processing device and is provided in the ambient atmosphere; wherein
   the vacuum processing device has a lubricating agent flow channel that is a channel for lubricating agent that is injected to a site subject to lubrication;
   the lubricating agent supply device comprising:
   a lubricating agent storage part that stores the lubricating agent in the ambient atmosphere;
   a lubricating agent supply channel that is connected to the lubricating agent storage part and the lubricating agent flow channel, and is a channel that guides the lubricating agent that is stored in the lubricating agent storage part to the lubricating agent flow channel; and
   an exhausting part that exhausts inside the lubricating agent supply channel.

2. The vacuum processing system according to claim 1, wherein
   the vacuum processing device comprises:
   a guide rail; and
   a movable body that can move along the guide rail;
   wherein the site subject to lubrication is a site that is in contact with the guide rail of the movable body provided at a position that covers a predetermined region of the guide rail.

3. The vacuum processing system according to claim 1, further comprising:
   a control device, wherein an opening and closing valve that is controlled by a control signal input from the control device is inserted in the lubricating agent flow channel;
   the lubricating agent supply device further comprising:
   an exhaust pipe that connects the lubricating agent supply channel and the exhausting part; and
   an exhaust valve that is inserted in the exhaust pipe and is controlled by a control signal input from the control device;
   wherein the control device causes the exhaust valve to be in an open condition, and then causes the opening and closing valve to be in an open condition when the inside of the lubricating agent supply channel is exhausted by the exhausting part and the passageway for lubricant supply is in a vacuum condition.

4. The vacuum processing system according to claim 1, wherein
   the vacuum processing device further comprises a first connecting part that is provided in the lubricating agent flow channel; and
   the lubricating agent supply device further comprises a second connecting part that detachably and hermetically connects to the first connecting part.

5. A lubricating agent supply device that supplies lubricating agent to a lubricating agent flow channel of a vacuum processing device that has the lubricating agent flow channel which is a channel for the lubricating agent that is introduced to a site subject to lubrication, comprising:
   a lubricating agent storage part that stores the lubricating agent in the ambient atmosphere;
   a lubricating agent supply channel that is connected to the lubricating agent storage part and the lubricating agent flow channel, and is a passageway that guides the lubricating agent that is stored in the lubricating agent storage part to the lubricating agent flow channel; and
   an exhausting part that exhausts inside the lubricating agent supply channel, wherein,
   an opening and closing valve that is controlled by a control signal input from a control device is inserted in the lubricating agent flow channel;
   the lubricating agent supply device further comprising:
   an exhaust pipe that connects the lubricating agent supply channel and the exhausting part; and
   an exhaust valve that is inserted in the exhaust pipe and is controlled by a control signal input from the control device;
   wherein the control device causes the exhaust valve to be in an open condition, and then causes the opening and closing valve to be in an opened condition when the inside of the lubricating agent supply channel is exhausted by the exhausting part and the lubricating agent supply channel is in a vacuum condition.

6. The lubricating agent supply device according to claim 5, further comprising:
   a second connecting part provided in the lubricating agent supply channel in order to connect to the lubricating agent flow channel; and
   a lubricating agent sending part configuring a part of the lubricating agent supply channel, and that transmits the lubricating agent stored in the lubricating agent storage part toward the second connecting part.

7. The lubricating agent supply device according to claim 5, further comprising:
   a lubricating agent capturing part provided between the lubricating agent supply channel and the exhausting part, and that captures the lubricating agent included in the gas that travels from the lubricating agent supply channel toward the exhausting part.

8. A lubricating agent supply method for supplying lubricating agent to a site subject to lubrication of at least one vacuum processing device provided in a vacuum, comprising:
   exhausting a gas that remains at a site that is located in the ambient atmosphere of a lubricating agent supply channel, the gas being exhausted from the lubricating agent storage part that stores the lubricating agent, and to the site subject to lubrication, wherein the site is provided in the ambient atmosphere; and
   transmitting the lubricating agent stored in the lubricating agent storage part to the site subject to lubrication of the vacuum processing device through the lubricating agent supply channel.

* * * * *